United States Patent [19]
Saxton et al.

[11] Patent Number: 5,979,335
[45] Date of Patent: Nov. 9, 1999

[54] RAILROAD FREIGHT CAR FOR CARRYING MOTOR VEHICLES

[75] Inventors: Gregory J. Saxton; Jon B. Zaerr, both of Portland, Oreg.

[73] Assignee: Gunderson, Inc., Portland, Oreg.

[21] Appl. No.: 09/039,056

[22] Filed: Mar. 13, 1998

Related U.S. Application Data

[62] Division of application No. 08/730,810, Oct. 17, 1996, Pat. No. 5,743,192.

[51] Int. Cl.$^6$ ...................................................... B61D 3/00
[52] U.S. Cl. .......................... 105/404; 105/355; 105/396; 105/409; 105/411; 52/45; 52/53
[58] Field of Search ..................................... 105/355, 396, 105/397, 399, 400, 401, 404, 407, 409, 411; 52/48, 88, 86, 82, 537; 296/210

[56] References Cited

U.S. PATENT DOCUMENTS

| | | | |
|---|---|---|---|
| 2,294,357 | 8/1942 | Dean et al. | 105/401 |
| 2,685,263 | 8/1954 | Barnes et al. | 52/48 |
| 3,405,661 | 10/1968 | Erickson et al. | 105/371 |
| 3,881,765 | 5/1975 | Cerra et al. | 52/48 |
| 3,911,831 | 10/1975 | Bunden | 105/378 |
| 3,995,563 | 12/1976 | Blunden | 105/378 |
| 3,996,368 | 12/1976 | Ravani et al. | 105/368 R |
| 4,077,330 | 3/1978 | Peisner et al. | 105/410 |
| 4,119,042 | 10/1978 | Naves et al. | 105/378 |
| 4,240,357 | 12/1980 | Phillips | 105/378 |
| 4,287,833 | 9/1981 | Roldness et al. | 105/378 |
| 4,759,669 | 7/1988 | Robertson et al. | 410/29 |
| 4,936,227 | 6/1990 | Baker et al. | 105/378 |
| 5,233,799 | 8/1993 | Abukawa | 52/53 |
| 5,392,717 | 2/1995 | Hesch et al. | 105/355 |
| 5,511,491 | 4/1996 | Hesch et al. | 105/404 |
| 5,601,033 | 2/1997 | Ehrlich et al. | 105/355 |
| 5,622,115 | 4/1997 | Ehrlich et al. | 105/3 |

FOREIGN PATENT DOCUMENTS

| 4143161 | 2/1992 | Japan | 105/355 |
|---|---|---|---|

OTHER PUBLICATIONS

Wabash National, The Allrailer Multilevel Railcar, advertising material regarding car in use by Sep. 1995.

*Primary Examiner*—Mark T. Le
*Attorney, Agent, or Firm*—Chernoff, Vilhauer, McClung & Stenzel, LLP

[57] ABSTRACT

A fully protective multi-unit railroad freight car for carrying motor vehicles on two or three levels with the lowest level being in a cargo well between a pair of deep side sills. A pair of vehicle-carrying decks are adjustable in height and are counterbalanced against each other during adjustment of their locations. A roof structure is light in weight and constructed of corrugated sheet metal with a self-supporting central portion. The ends of the car are equipped with three-panel folding doors, and a flexible diaphragm closes the space between articulated adjacent car units supported by a shared truck. A modular brake operating system is mounted on the car body.

4 Claims, 14 Drawing Sheets

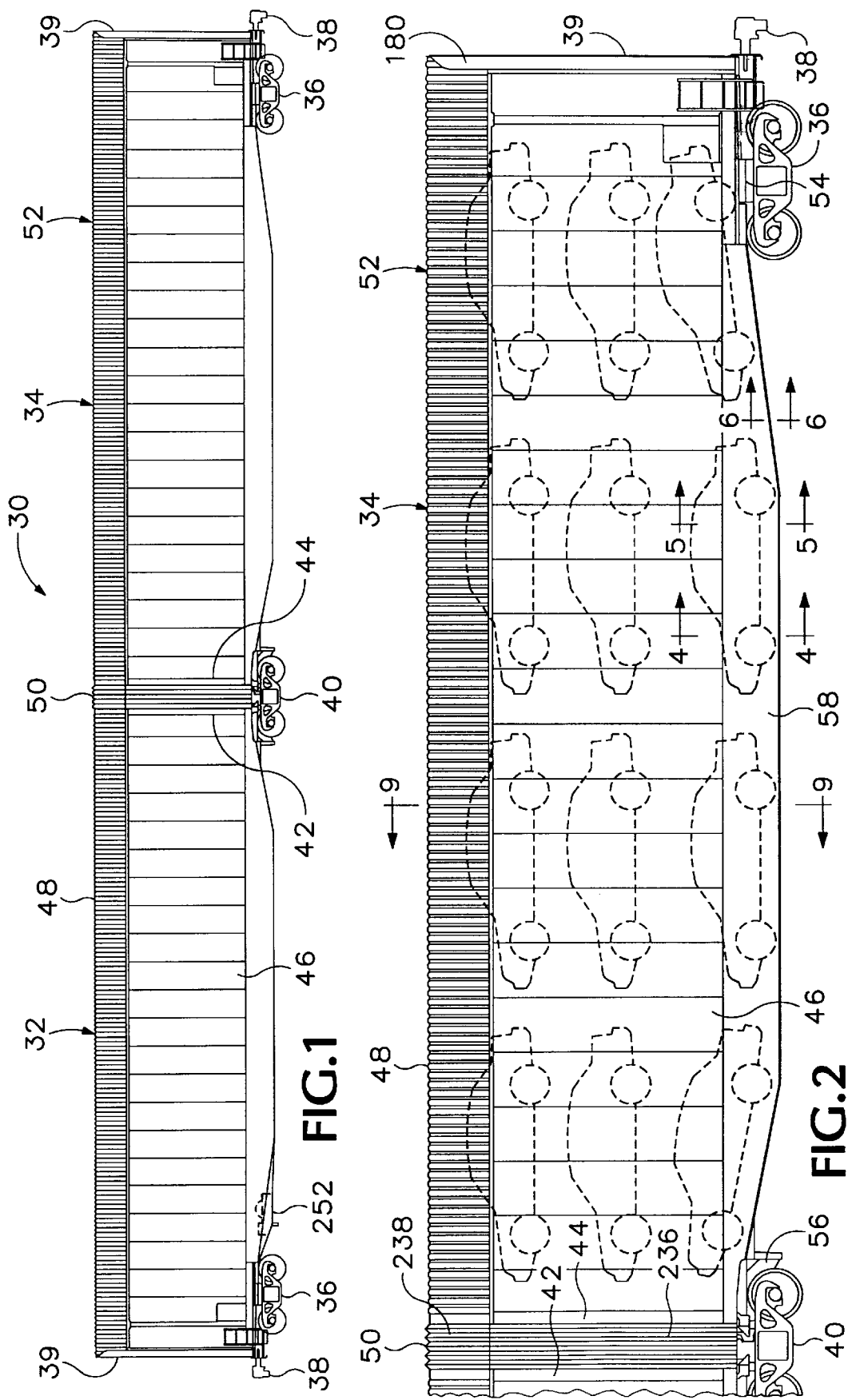

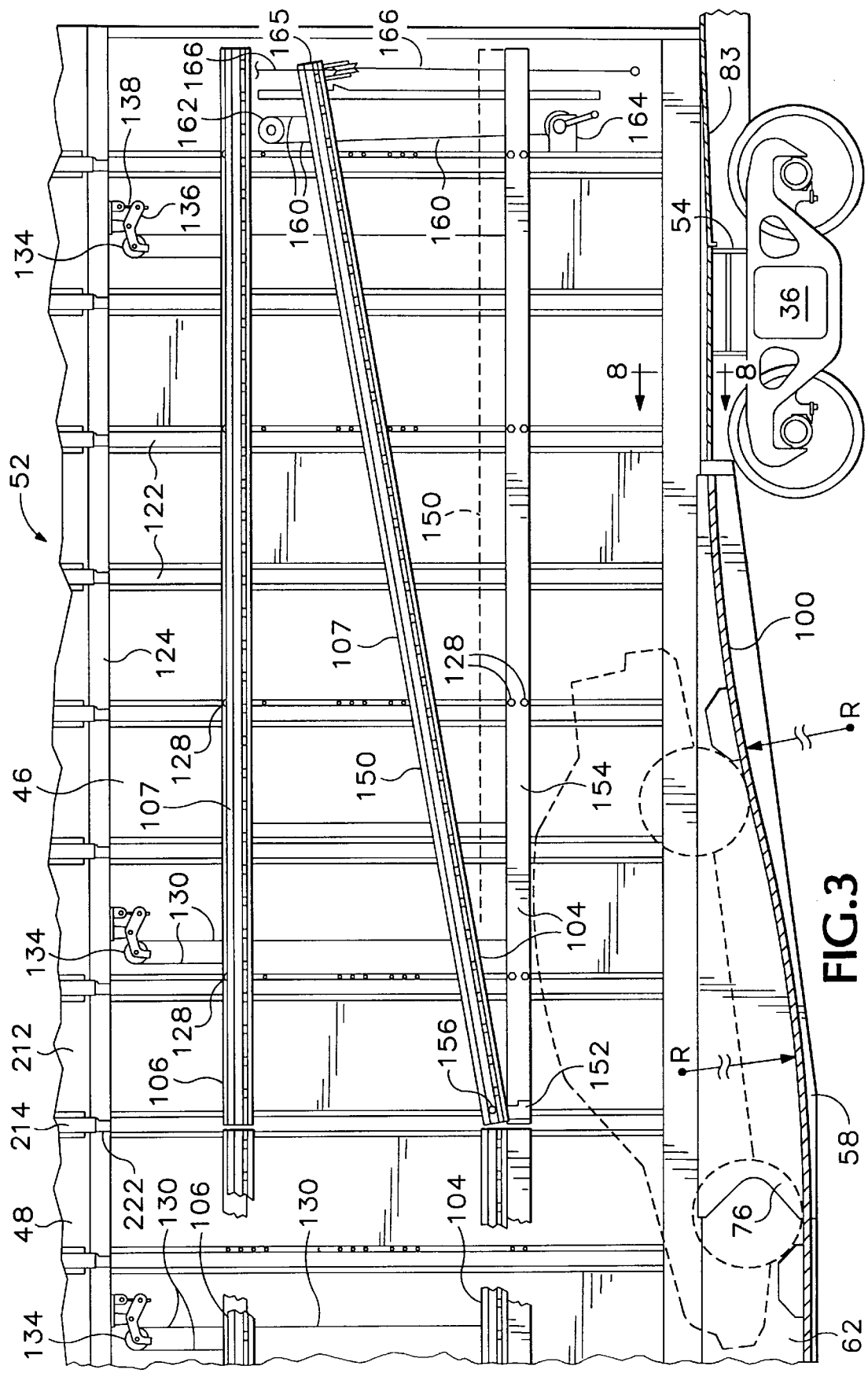

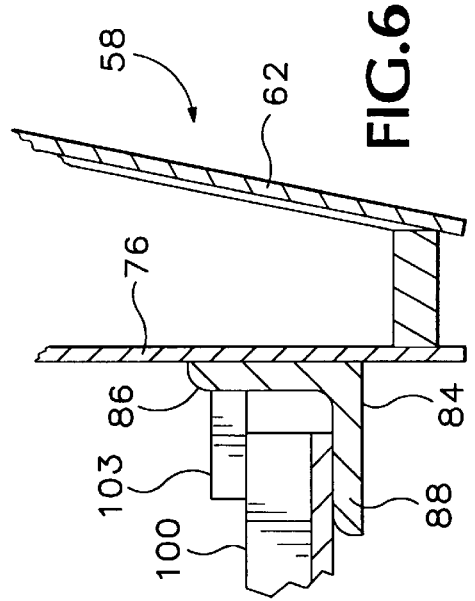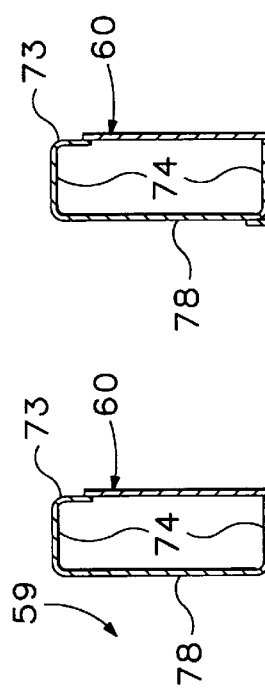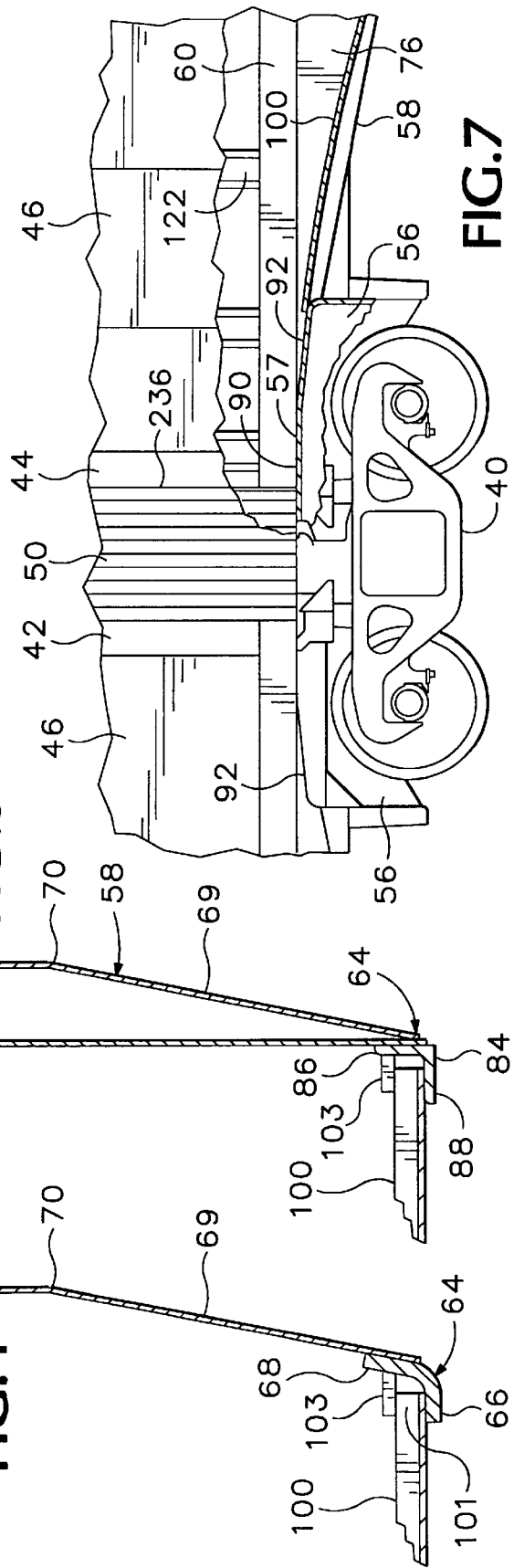

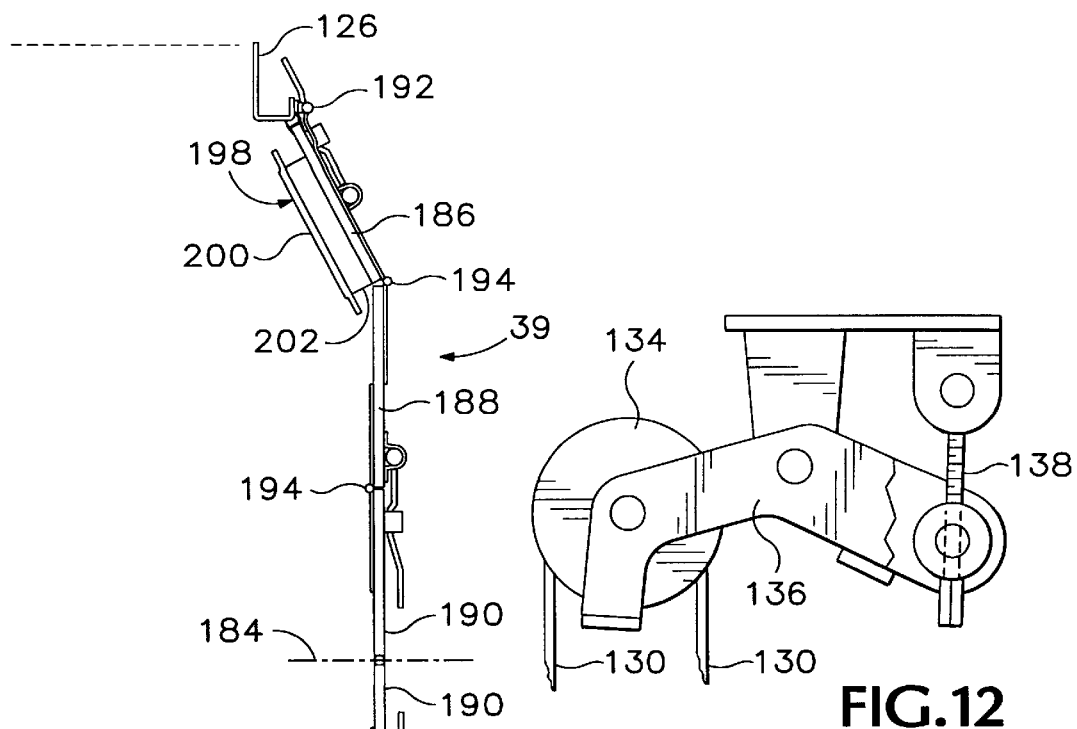
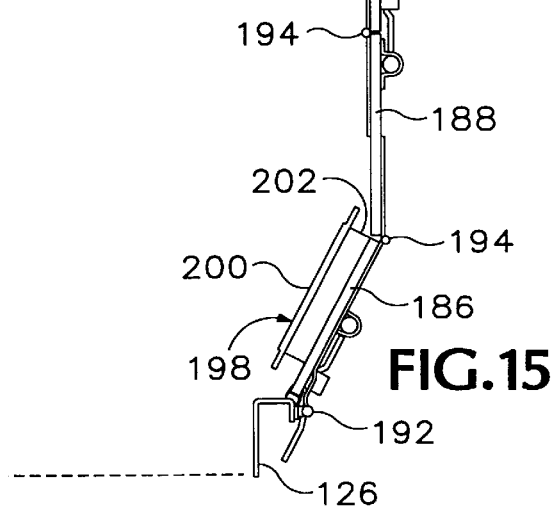
FIG.15
FIG.12
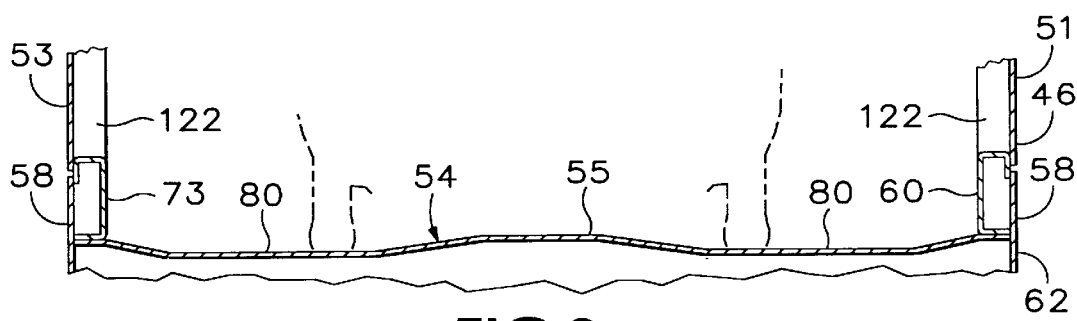
FIG.8

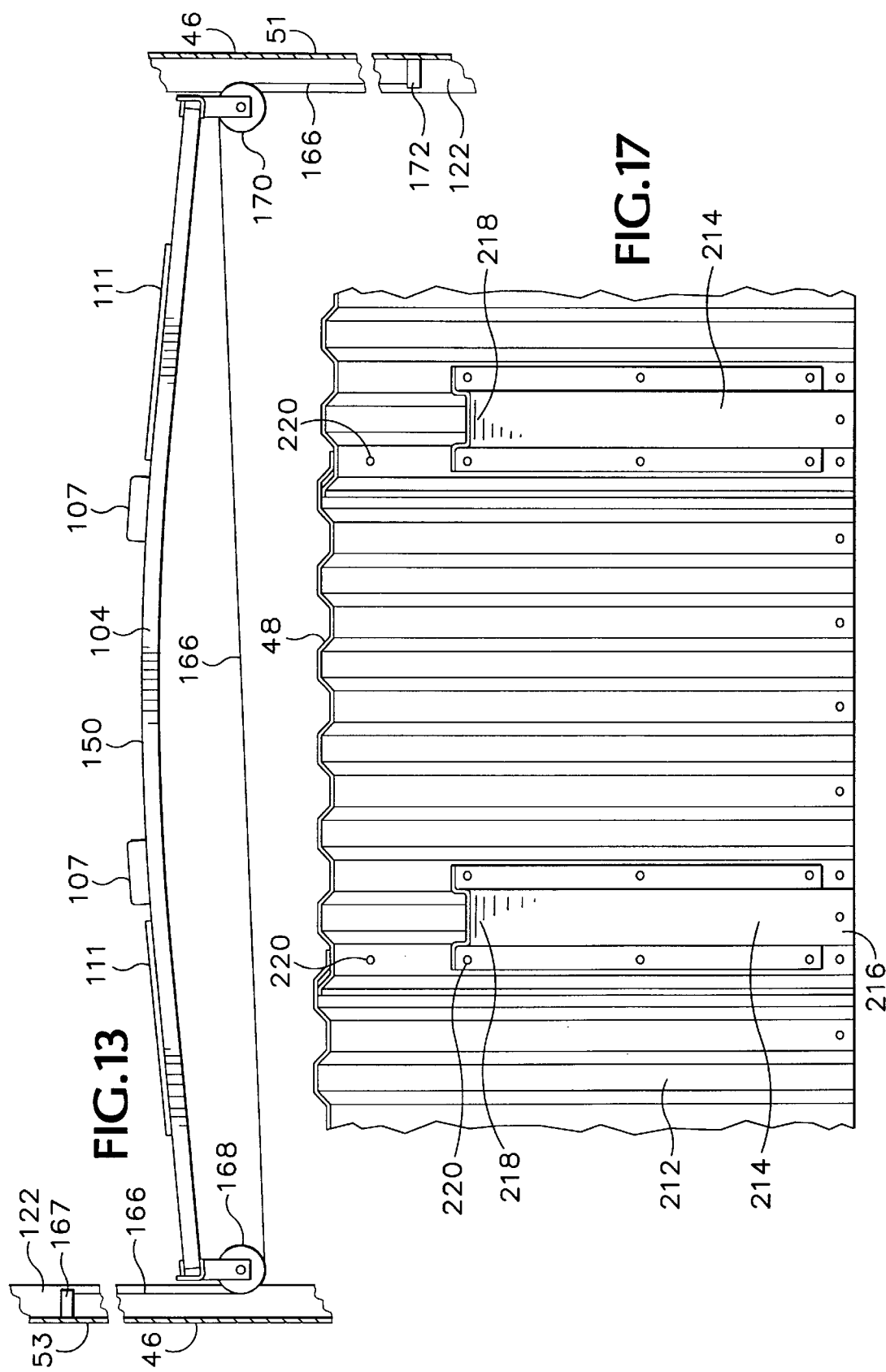

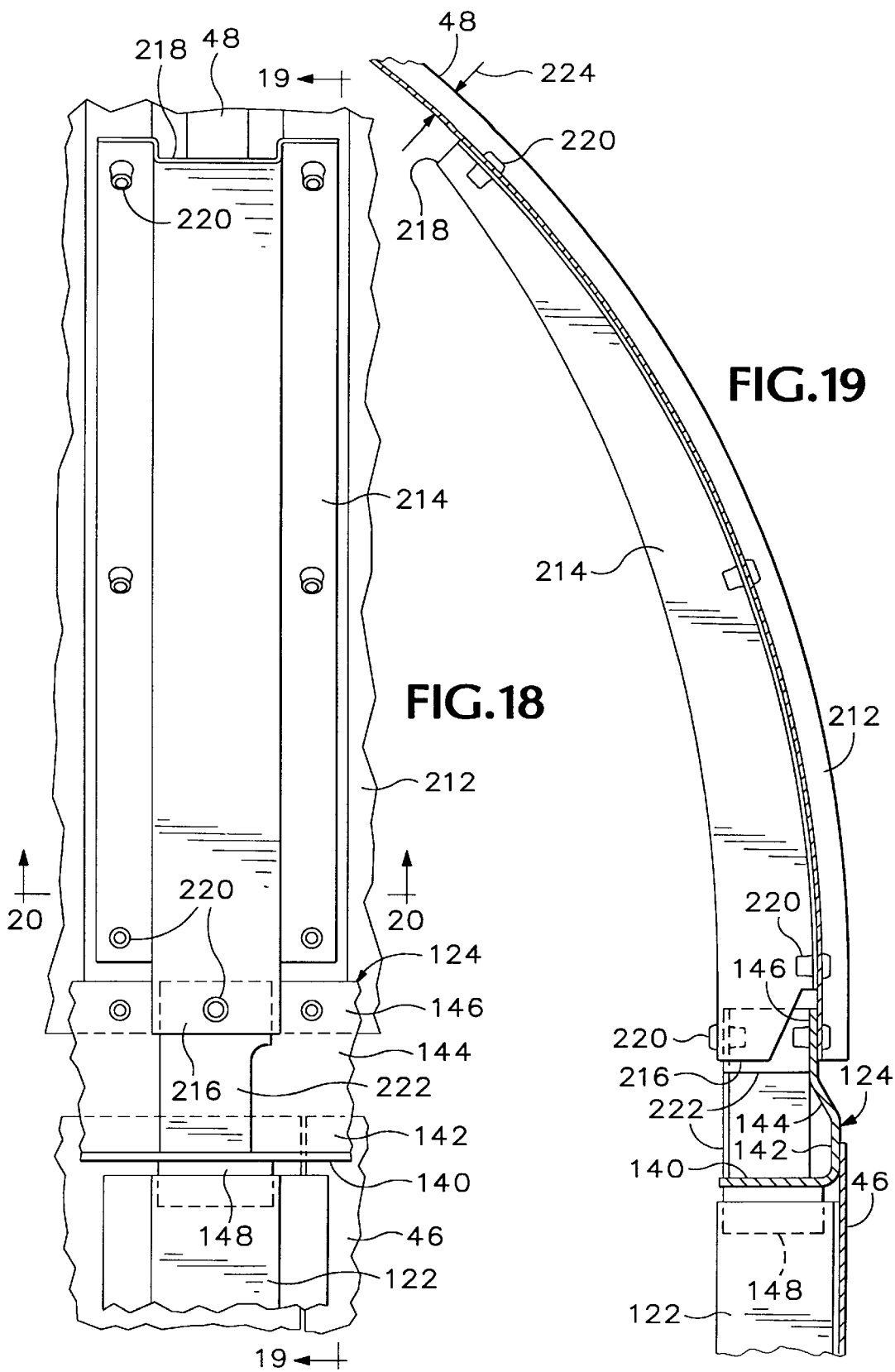

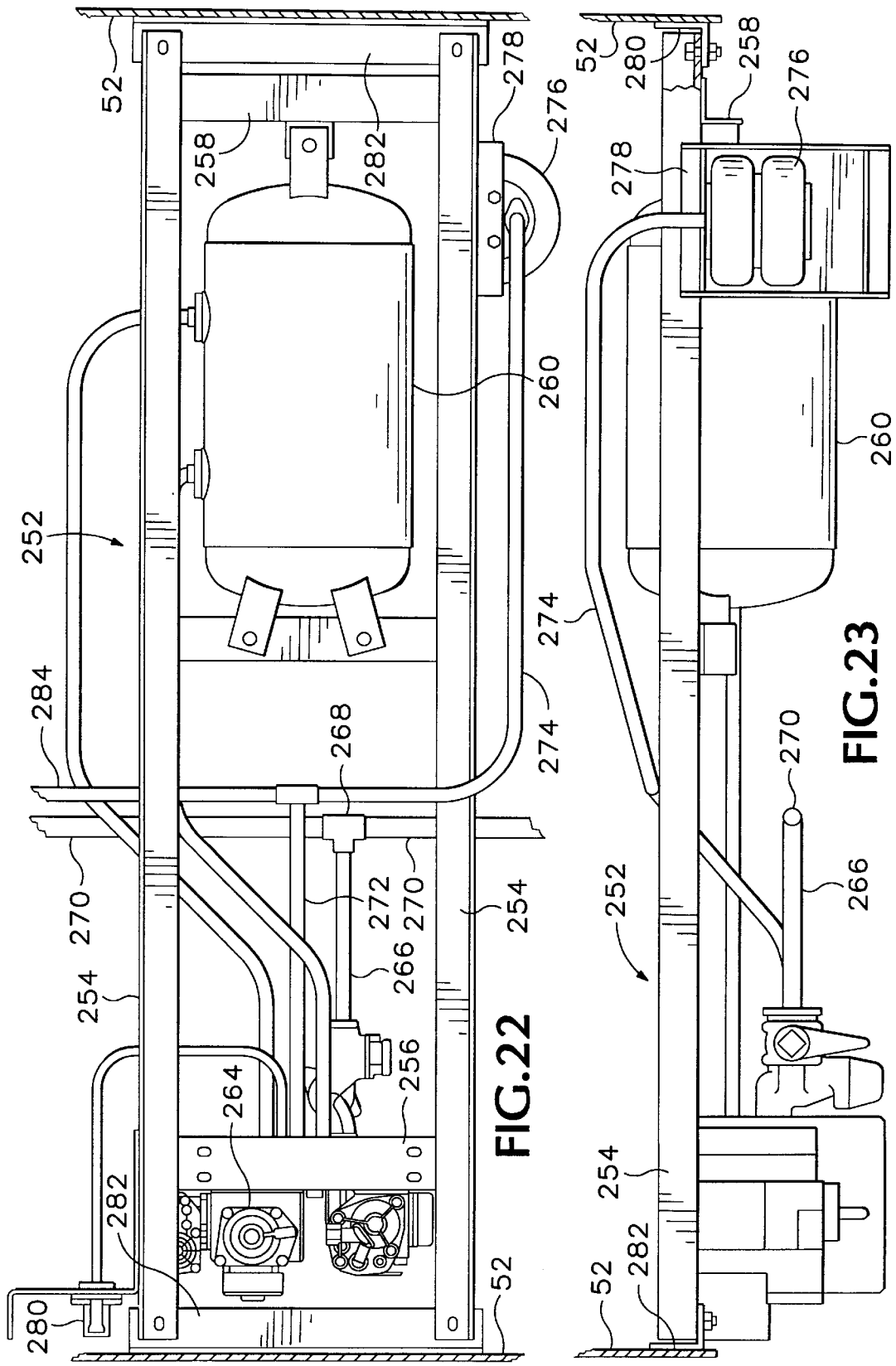

RAILROAD FREIGHT CAR FOR CARRYING MOTOR VEHICLES

This is a division of U.S. patent application Ser. No. 08/730,810, filed Oct. 17, 1996 now U.S. Pat. No. 5,743,192.

BACKGROUND OF THE INVENTION

The present invention relates to railroad freight cars and in particular to an articulated multi-unit freight car for carrying motor vehicles on multiple levels.

Railroad freight cars have long been used for transporting newly manufactured automobiles long distances from the point of manufacture or a port of arrival to cities where dealerships are located or where the automobiles are reloaded onto trucks for moving the automobiles over highways to the locations of dealerships. In order for such railroad freight cars to be most economical it is desirable to carry a maximum number of motor vehicles on each railroad car, but it is also desired to be able to carry several different types of motor vehicles on each car and to be able to reconfigure the railroad freight car to carry such different types of vehicles without undue difficulty.

It is known to adjust load-carrying decks in motor vehicle-carrying railroad cars to facilitate carrying different types of motor vehicles, but provisions for making such adjustments in the past have been unsatisfactory.

Not only is it desired to carry a maximum number of automobiles or other motor vehicles on each railroad car, it is also desired to keep the center of gravity of a loaded car as low as possible, to promote lateral stability of the loaded railroad car. Railroad cars are restricted in size to fit within clearance envelopes established by agreements reached among railroads in order to avoid collisions between trains on adjacent tracks and to ensure that all cars fit within the clearances available along the rail lines at places such as bridges and tunnels.

In order to avoid pilferage or vandalism of motor vehicles and to protect motor vehicles from airborne hazards, many railroad freight cars designed to carry motor vehicles are enclosed and include roofs and end doors. The height of such a car, including its roof, is limited by the applicable clearance envelope. In order to have a maximum of height available within the confined space inside such a railroad freight car, then, it is desired for the structure of its roof to be as shallow as practical consistent with the strength required for the roof to withstand the weather and the forces resulting from loading, unloading, and operation of the car as part of a train.

Although doors are needed at the ends of such railroad freight cars to protect the motor vehicles carried inside, it must be possible to open the doors to provide ample clearance for loading and unloading the cars, and it would be desired to do so without the open doors being in the way of locomotives or cars on adjacent tracks.

While it is necessary for a person to be able to climb to upper vehicle-carrying decks in such a car during the process of loading vehicles onto the car or unloading them from the car, it is otherwise undesirable for access to the upper decks to be available.

At most times it is desired to limit entry of air, which may include smoke and airborne dust of types which may be corrosive or abrasive and thus easily able to damage the surface finish of newly-manufactured motor vehicles. This is important particularly because it takes a significant amount of time for paint and other protective coatings to reach to their maximum toughness and hardness.

What is needed, then, is an improved railroad freight car which is easily adjustable to serve for carrying a maximum number of motor vehicles of differing sizes and for providing ample protection of such motor vehicles against pilferage and against damage from the elements.

SUMMARY OF THE INVENTION

The present invention overcomes the aforementioned shortcomings of prior art railroad cars and meets the aforementioned needs by providing an improved multi-unit railroad freight car for carrying motor vehicles on multiple levels, protectively covered, in railroad car bodies each including a motor vehicle-carrying floor in a well defined between a pair of side sills. In a railroad freight car which is a preferred embodiment of the present invention, portions of the floor of each well are inclined, and the top of an intermediate body bolster located at one end of the well is also inclined downwardly toward the bottom of the well.

In one embodiment of the present invention a pair of motor vehicle decks are spaced upwardly above the well floor, where they are adjustable in height and are counterbalanced against each other to facilitate movement of both decks.

In a preferred embodiment of the car, a pair of three-panel doors are provided at each end of the car and at least one such three-panel door carries a ladder on an inner side of one panel, so that the ladder is accessible when the three-panel door is open but is not available when the door is closed.

A railroad car which is one embodiment of the invention includes protective side walls of sheet metal construction each including side posts extending upwardly above a middle chord, included in a side sill, to a top chord of the car body.

In one embodiment of such a car, a roof of transversely corrugated sheet metal extends upwardly and transversely above the side walls, interconnecting the two side walls on opposite sides of the car body, with reinforcement and support of the roof provided by tapered carnines which extend upwardly and slope inwardly along steeply inclined lateral portions of the roof but do not extend across the substantially horizontal, center portion of the roof, which is self-supporting, yet has a shallow depth leaving a maximum interior height available inside the car body.

In accordance with another aspect of the present invention several brake system components are assembled into a module which can be tested separately from the remainder of the car and which is installed and may be removed from the car as a module, simplifying assembly and installation of the brake system.

In a preferred embodiment of the present invention, clearance for accommodating the height of vehicles is maximized by reducing the height of surfaces supporting the laterally spaced-apart wheels of motor vehicles and increasing the height of bottom surfaces of motor vehicle decks by providing cambered deck profiles.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side elevational view of a multi-unit railroad freight car embodying the present invention.

FIG. 2 is a side elevational view of one car unit and a part of the other unit of the car shown in FIG. 1, at an enlarged scale.

FIG. 3 is a cutaway side elevational view of a car body of one unit of the multi-unit railroad freight car shown in FIG. 1 showing the mechanisms for adjusting the heights of the motor vehicle-carrying decks of the car body and showing an end portion of one of the motor-vehicle-carrying decks in a upwardly inclined position to provide clearance during loading and unloading. of the car.

FIG. 4 is a section view, at an enlarged scale, of a side sill of the car body of the car unit shown in FIG. 2, taken along line 4—4.

FIG. 5 is a section view, at an enlarged scale, of a side sill of the car body of the car unit shown in FIG. 2, taken along line 5—5.

FIG. 6 is a section view, at an enlarged scale, of a side sill of the car body of the car unit shown in FIG. 2, taken along line 6—6.

FIG. 7 is a partially cutaway view of parts of the adjacent ends of the multi-unit car shown in FIG. 1, at an enlarged scale.

FIG. 8 is a section of a top portion of the body bolster and lower portions of the side walls f the car body shown in FIG. 3, taken along line 8—8.

FIG. 12 is a detail view of a part of the mechanisms for adjusting the heights of the motor vehicle-carrying decks of the car body.

FIG. 13 is a simplified schematic end view of the car body shown in FIG. 3, showing a portion of the support apparatus used for raising an end portion of a motor vehicle-carrying deck during loading and unloading of the freight car.

FIG. 15 is a top plan view of an end portion of the railroad freight car shown in FIG. 1, with the three-panel doors shown in FIG. 14 in a closed position.

FIG. 17 is a partially cutaway side view of a portion of the roof of the railroad freight car shown in FIG. 1, at an enlarged scale.

FIG. 18 is a detail view, at an enlarged scale, showing the manner of attachment of the roof shown in FIG. 17 to the side wall of the railroad car shown in FIG. 1.

FIG. 19 is a view taken in the direction indicated by line 19—19 in FIG. 18, showing the interconnection of the roof shown in FIG. 17 to the side wall of the railroad car shown in FIG. 1.

FIG. 22 is a top plan view of the air brake system module shown in FIG. 1.

FIG. 23 is a front elevational view of the air brake system module shown in FIG. 22.

DETAILED DESCRIPTION OF THE INVENTION

Figure 9:
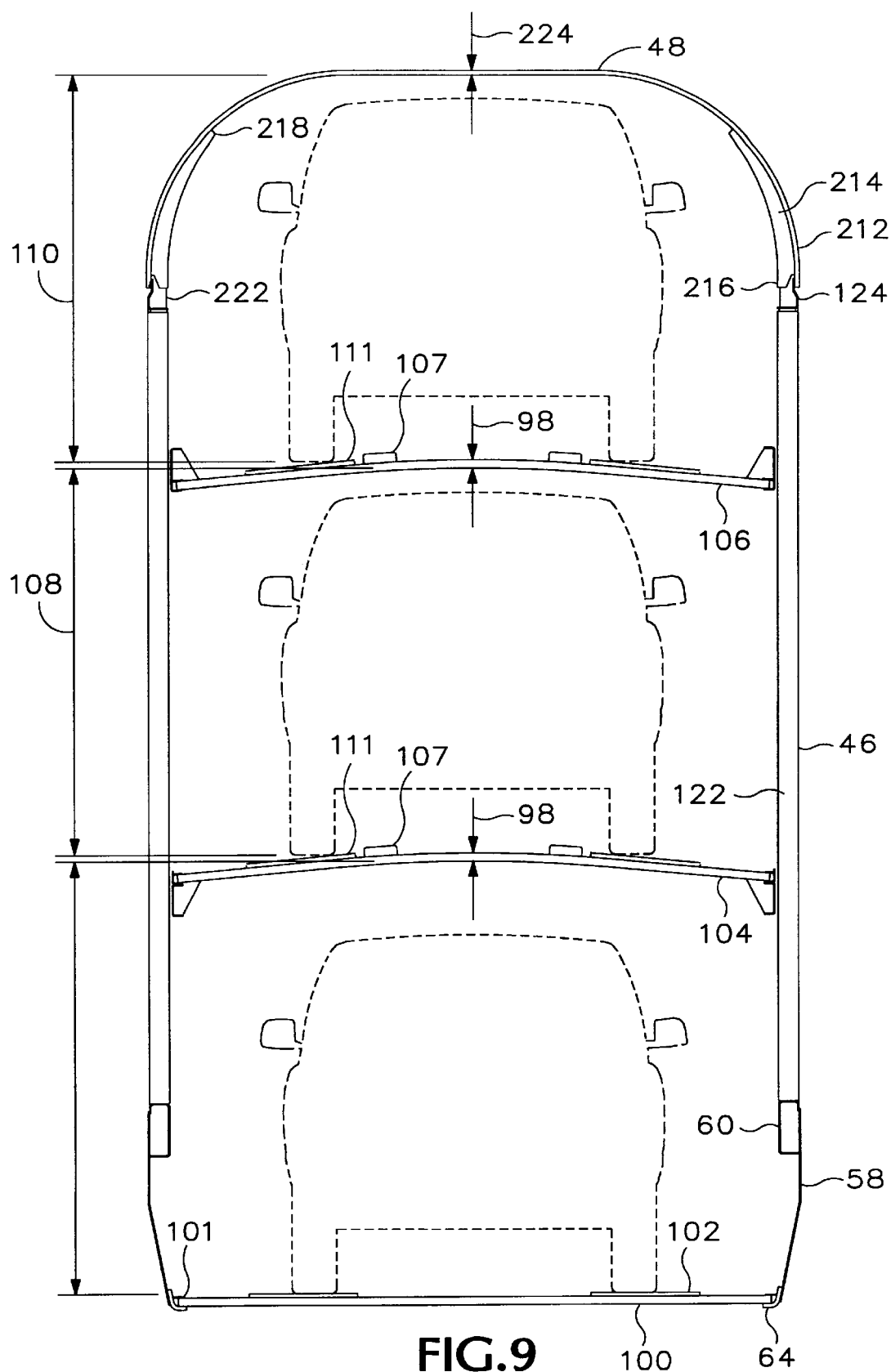
FIG. 9 is a simplified sectional view of the car body shown in FIG. 2, taken along line 9—9, showing a pair of motor vehicle-carrying decks in a first configuration.

Referring now to FIG. 1 of the drawings which form a part of the disclosure herein, a multi-unit railroad freight car 30 embodying the present invention includes a pair of car units 32 and 34, with a conventional two axle truck 36 and a coupler 38 at an outer end 39 of each of the car units 32 and 34. A shared truck 40 supports both of a pair of adjacent ends 42, 44 of the car units 32, 34, which are interconnected with each other and the shared truck 40 through an articulating coupling 45 associated with the shared truck 40.

The car units 32, 34 each have enclosed bodies with upright side walls 46 and roofs 48, and a flexible cover or diaphragm 50 interconnects the side walls 46 and roof 48 of the car unit 32 with those of the adjacent car unit 34.

Cargo Well

Referring to FIGS. 2, 3, 4, 5, 6, 7 and 8, the car unit 34, which is essentially identical to the car unit 32, includes a car body 52 whose structure includes a body bolster 54 at its outer end 39, and a body bolster 56 at its opposite, or articulated, end, supported by the previously-mentioned shared truck 40. Extending along a pair of laterally opposite sides 51 and 53 of the car body 52, and interconnecting the body bolsters 54 and 56, are a pair of deep side sills 58, defining a cargo well 59. Each side sill 58 includes a middle chord 60 of the car body 52, a downwardly extending web plate 62, and a bottom chord 64.

In a longitudinally central portion of the car body 52, the bottom chord 64 is a longitudinally extending piece of bent plate thicker than the web plate 62, having a generally horizontal, inwardly-extending flange portion 66 interconnected through an arcuately curved portion with a diagonally upwardly and outwardly inclined leg 68 extending parallel with and welded to a lower portion 69 of the web plate 62. The lower portion 69 extends diagonally downwardly and inwardly from a horizontally extending longitudinal bend line 70, above which the web plate 62 extends generally vertically. The middle chord 60 may include a deep C-shaped formed channel 73 whose legs 74 extend outwardly and which is welded to the inner side and upper margin of the web plate 62, forming a box section similar in form similar to that of the side sills of the railroad freight car disclosed in U.S. Pat. No. 5,170,718.

In the portions of the car body 52 that are closer to the body bolsters 54 and 56, tapered fishtail-shaped plates 76 extending generally vertically and longitudinally are located alongside and laterally spaced inwardly apart from the web plate 62, depending beneath the inner side or web 78 of the C-shaped channel 73 of the middle chord 60. The web plate 62 is similarly tapered to a shallower depth near the body bolsters 54 and 56. The bottom chord 64 in the tapered portions of each side sill 58 extends at an upwardly inclined slope toward the respective one of the body bolsters 54, 56. In the tapered end portions of the side sills 58 the bottom chord 64 is a substantial angle member 84 attached to the inner face of each plate 76 with an upright leg 86 welded to the plate 76 and an inwardly-directed horizontal leg 88.

The body bolster 54 at each outer end of the car 30 is of a shallow transversely-extending box configuration including a top plate 55 which extends transversely of the car between the middle chords 60 of the two side sills 58. A pair of portions 80 of the top plate 55, on either side of the center bearing of the truck 36, are depressed a small distance as channels to receive the wheels of a motor vehicle and thus to provide a small additional amount of overhead clearance. A floor plate 83 extending from the top plate 55 to the outer end 39 of the car body 52 is sloped upwardly from the portion 80 toward the outer end 39 of the car body 52, at a shallow angle of, for example, about 2°.

The body bolster 56 adjacent the articulated end of each car unit 32, 34 is of a non-rectangular transverse box design and has a heavy top plate 57 including an end portion 90 located nearer the end 42 of the car unit 32, whose top surface is generally horizontal, while an inner portion 92 of the top plate 57, closer to the middle of the car unit 34, is inclined downwardly toward the longitudinally central portion of the car body 52, at a shallow angle of, for example, approximately 5° below the horizontal.

The middle chords 60 on each side 51 and 53 of the car body rest atop the laterally outboard portions of the body bolsters 54 and 56, thus resting on the top plates 55 and 57. The side sills 58 are welded to the body bolsters 54 and 56 with only the middle chords 60 above the body bolsters 54 and 56, and with the rest of the side sills depending below the height of the top plates 55 and 57 to define the cargo well between the side sills 58 and between the body bolsters 54 and 56.

Resting atop and interconnected with the bottom chords 64 of the side sills 58 is a transversely-extending well floor 100, which is generally flat in a transverse direction and substantially planar and horizontal in the longitudinally central portion of the car body 52. The well floor 100 is inclined upwardly toward the sloped portion 92 of the top plate 57 of the body bolster 56. The well floor 100 is preferably very gradually curved as seen in side view (FIGS. 3,7), and the angle member 84 is bent to support the well floor in such a large-radius curvature. The well floor is constructed of transversely corrugated sheet metal, to provide the required strength with light weight, and is held down to the bottom chord 64 of the side sills 58 by flat bar 103 located atop the lateral margins 101 of the well floor 100 and welded to the web plate 62 of the side sills 58.

An additional layer of material is located atop the corrugated sheet metal along the tracks to be followed by the tires of motor vehicles being carried, and includes an upper, motor vehicle-supporting surface 102. The upper surface 102 of the well floor 100 at each end of the car body 52 is aligned in height even with the top of the respective body bolster 54 or 56.

The upper surface 102 of the well floor is defined in one embodiment of the invention by a grating of a type compatible with a chock system permitting chocks to be attached to the grating at any required position along the upper surface 102 of the well floor 100 to hold a motor vehicle in any desired position along the well floor 100. One such chock system, for example, is disclosed in Winsor U.S. Pat. No. 5,302,063, of which the disclosure is hereby incorporated herein by reference, and the radius of curvature of the well floor is great enough, with only large radius curvatures, with a radius of 350 inches or more, 440 inches for example, so that such a chock can be mounted at any location along the well floor 100, without any positions made unavailable by curvature.

The central portion of the well floor 100 thus is as much as 26 inches below the tops of the body bolsters 54 and 56, which permits motor vehicles to be carried with their wheels supported at a minimum height above the tracks on which the railroad car 30 is located. This lowers the center of gravity of the loaded car, while providing a maximum clearance height within the car bodies 52, above motor vehicles stowed in the cargo wells 59 of the car 30. The large radius of curvature of the sloped parts of well floor 100 also assures ample clearance beneath the bottom of a motor vehicle being loaded or unloaded over the trucks 36 and 40.

Movable Decks

Motor vehicle-carrying decks 104 and 106 are provided above the well floor 100 to support motor vehicles in the car units 32 and 34 at one or two additional levels. Preferably, the motor vehicle-carrying decks 104 and 106 are of transversely corrugated sheet metal structure, transversely arched to provide an upward camber, with downwardly open, shallow channel members 107 extending longitudinally of the car body 52 welded to the top of the decks 104, 106 to add longitudinal rigidity. This structure allows the decks 104 and 106 to have a very small vertical depth 98 so that a maximum vertical clearance is available for motor vehicles to be carried.

Figure 10:
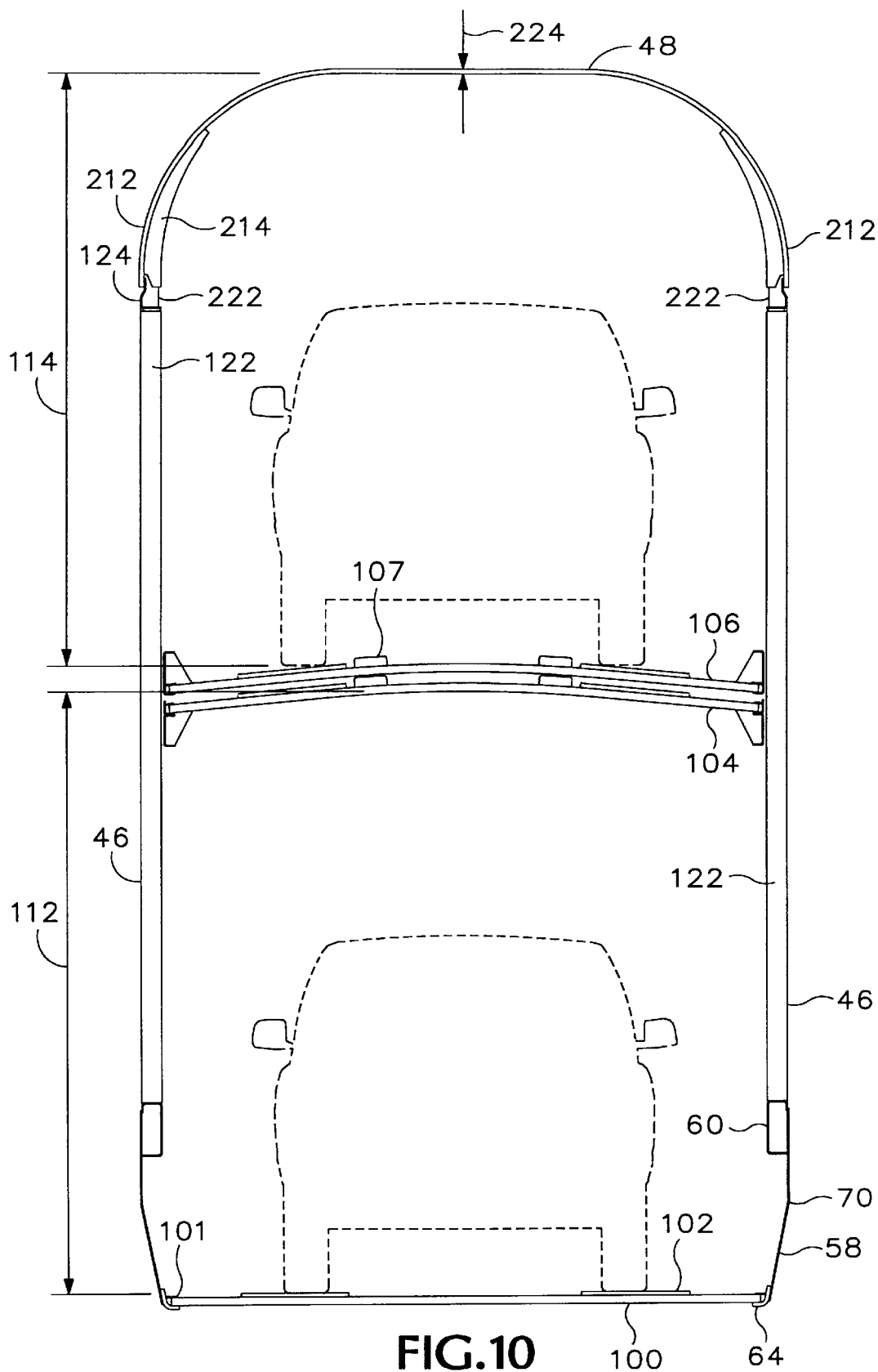
FIG. 10 is a sectional view, taken on the same plane as FIG. 9, showing the motor vehicle-carrying decks in a different configuration.
Figure 11:
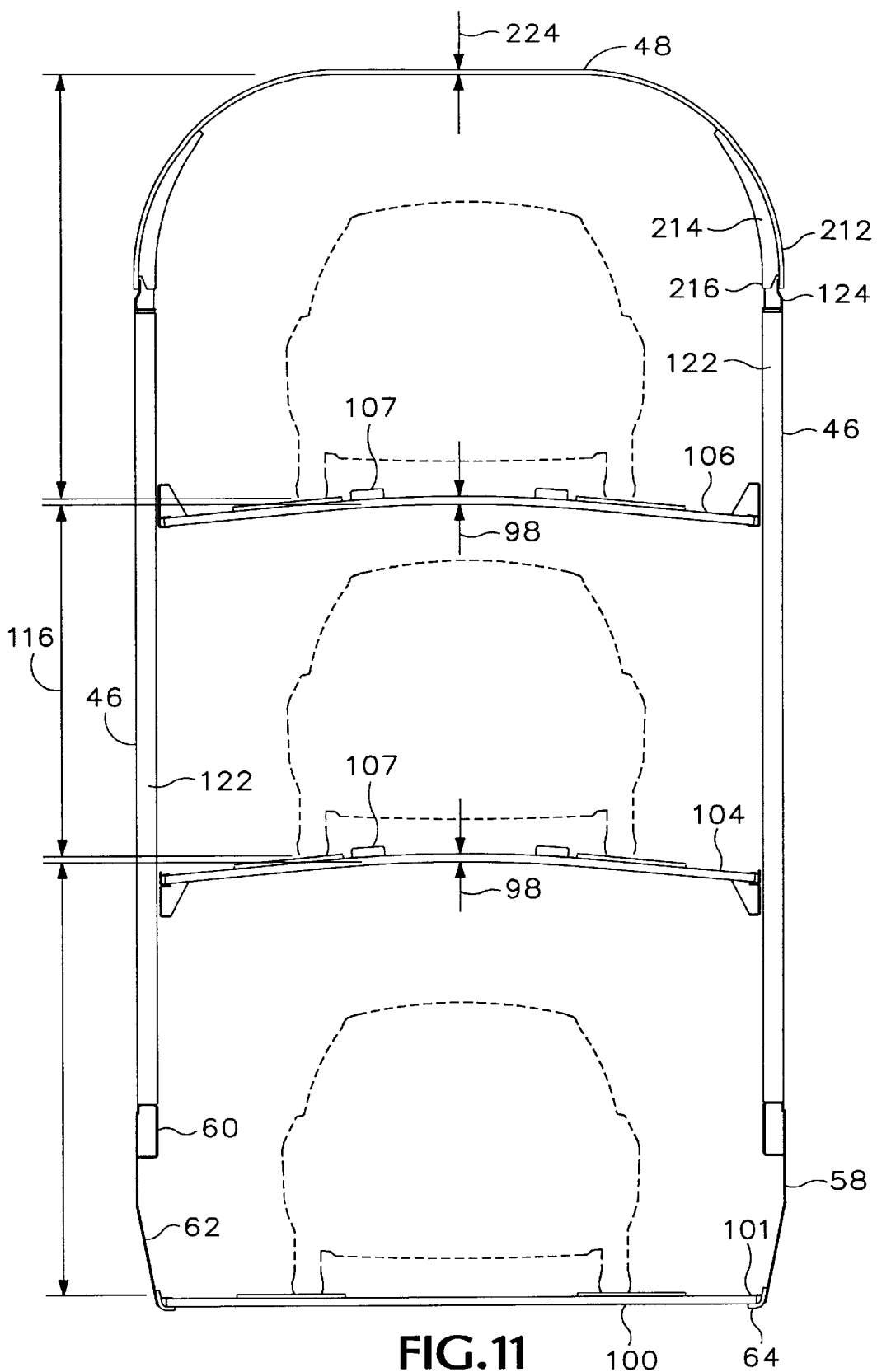
FIG. 11 is a sectional view, taken along the same plane as FIG. 9, showing the motor vehicle-carrying decks in yet a third configuration.

The two motor vehicle-carrying decks 104, 106 are adjustable in height to provide different amounts of vertical clearance above, between, and below them as is illustrated in FIGS. 9, 10, and 11. In a first arrangement of the motor vehicle-carrying decks 104, 106, shown in FIG. 9, approximately equal clearance heights 108, 110 are provided above both of the motor vehicle-carrying decks 104, 106, so that the railroad car 30 can be used to carry moderately tall motor vehicles such as mini-vans on all three levels of the car body 52. The motor vehicle-carrying decks 104 and 106 preferably also have grates 111 compatible with the previously-mentioned chock system as their upper surfaces along the wheel tracks for motor vehicles to be carried.

In FIG. 10, the two motor vehicle-carrying decks 104 and 106 are shown in a mid-height position with the upper motor vehicle-carrying deck 106 closely atop the lower motor vehicle-carrying deck 104, giving maximum height clearances 112, 114 above the well floor 100 and above the upper motor vehicle supporting deck 106, to permit taller motor vehicles such as light trucks to be carried on both the well floor 100 and the upper motor vehicle-carrying deck 106.

In FIG. 11, the motor vehicle-carrying decks 104 and 106 are shown arranged at heights similar to those of motor vehicle decks available in previously known railroad cars, in order to facilitate loading and unloading the railcar 30 at loading docks designed to accommodate previously known motor vehicle-carrying railcars. This arrangement of the motor vehicle-carrying decks 104, 106 provides only a smaller clearance height 116 between the lower and upper motor vehicle-carrying decks 104 and 106, but provides for carriage of motor vehicles of low overall height with the center of gravity of the loaded car 30 somewhat lower by comparison with the arrangement shown in FIG. 9. Nevertheless, the vertical clearance 116 is ample for a passenger auto between the top surface of the lower motor vehicle supporting deck 104 and the bottom of the upper motor vehicle supporting deck 106, in a preferred embodiment of the invention.

As may be seen with reference to FIGS. 3 and 12, the adjustment of the heights of the motor vehicle-carrying decks 104 and 106 is accomplished easily in the railcar 30 according to the present invention. Each side wall 46 of the car body 52 includes upright side posts 122 spaced apart from each other longitudinally of the car body, with a center-to-center spacing of 3 feet, for example. The side walls 46 are preferably of welded sheet metal construction including flanged rolled channels forming the upright side posts 122 so that the side walls are light, yet strong enough to support the weight of the motor vehicle-carrying decks 104, 106 and the motor vehicles carried thereon. A top chord 124 extending longitudinally of the car 30, between corner posts 126 located respectively at each end of the car body 52, interconnects the upper ends of the side posts 122. The top chord 124 is preferably of formed metal plate, for example ¼ inch thick, with a horizontal inwardly directed bottom, or foot portion 140, a lower vertical portion 142, an upward diagonal portion 144, and a vertical upper margin portion 146.

Each upright side post 122 of the side wall 46 is attached to the top chord 124 by a short filler plug 148 which is welded to the bottom of the inwardly-directed horizontal foot portion 140 of the top chord 124, and which extends downwardly within the upwardly-open top end of the side post 122, while the upper end of the outermost sheet of the side wall 46 extends upwardly along the lower vertical portion 142 of the top chord member 124.

The motor vehicle decks 104 and 106 are each provided in the form of three segments arranged end-to-end, and, at any of the available heights, each of the segments is fastened securely and tightly to the side posts 122 by bolts 128 or other releasable but tight fasteners so that the motor vehicle-carrying decks 104 and 106 are incorporated structurally in and add rigidity to the entire car body 52 as well as being solidly supported by the side walls 46.

The corresponding segments of each deck 104, 106 located above one another are connected to each other and counterbalanced against each other through a set of interconnecting and supporting cables 130, each of which extends upwardly from both of a pair of interconnected counterbalancing deck segments and rides around a respective pulley 134 supported by the top chord 124 of the respective one of the side walls 46. Preferably, the height of each pulley 134 is adjustable, as by the pulley 134 being suspended from a lever 136 movable by means of an adjustment screw 138 to place the respective cable 130 in tension and thus transfer a respective part of the weight of the respective segment of both motor vehicle-carrying decks 104, 106 to the pulley.

When the paired segments of the motor vehicle-carrying decks 104 and 106 are unfastened from the side posts 122 by removing the bolts 128 they are supported by the cables 130 and can be moved toward and away from each other in a counterbalanced relationship in moving, for example, between the positions shown in FIG. 9 and the positions shown in FIG. 10. Once the position of a segment of one of the decks 104, 106 has been.established and that segment is secured in place by bolts 128 attaching it to the side posts 122, the position of the other deck segment of the pair can be adjusted precisely by movement of the screw 138 that controls the lever 136 supporting the pulley 134 with respect to each end and each side of the motor vehicle-carrying deck segment concerned. The same method is used for adjusting the heights of each of the pairs of segments of the upper and lower motor vehicle-carrying decks 104, 106 for the entire length of each car unit 32 or 34.

Adjacent each end of each car unit 32 or 34, a hinged portion 150 of the lower motor vehicle-carrying deck 104 can be raised as much as about 4 feet to an inclined position above the beams 154, which remain fastened to the side walls 46 by the bolts 128 and extend longitudinally of the car. An inner end of the hinged portion 150 of the deck is attached to the beams 154 by hinges 152. The hinges 152 extend upward to a pivot axis 156 through which the inner end of the of the deck is attached to the longitudinal beams 154 on either side.

A winch line or lifting cable 160 is connected to the hinged portion 150 of the deck 104, on the first side 51 of the car body 52, near an end of the car unit, and extends upward around a sheave 162 which may be mounted in a fixed location, preferably on the first side post 122 of the car body toward the mid-length of each car unit from the nearest corner post 126. The cable 160 extends from the sheave 162 down to a winch 164, which may be manually operable, power-driven, or adapted to receive a portable motor, and which is used to raise the hinged portion 150 of the deck 104 by winding up the lifting cable 160.

As shown in FIG. 13, the movable outer end 165 of the hinged portion 150 of the motor-vehicle carrying deck 104 is kept level, and twisting is prevented, by a static line 166 attached to the side wall 46 of the car body 52 in a location 167 near the lifting cable sheave 162, but on the laterally opposite side 53 of the car body 52. The static line 166 may be a steel cable, for example, and extends downward and beneath a guide element such as the static line sheave 168 attached to the hinged portion 150, and thence transversely beneath the hinged portion 150 of the deck 104 to the side of the deck where the lifting cable 160 is located. The static line 166 then passes over the top of another guide element attached to the hinging segment 150, such as a second static line sheave 170, and extends further downward, to a location 172 where a lower end of the static line 166 is fixedly attached to the side wall 46 of the car body 52. With the appropriate amount of tension maintained in the static line 166, regardless of the height of the hinged portion 150 of the deck 104, and regardless of the position of the entire lower motor vehicle-carrying deck 104 with respect to the car body 52, the static line 166 will keep the outer end 165 of the hinged portion 150 of the deck substantially level with the side of the hinged portion 150 of the deck to which the lifting cable 160 is connected.

The hinged portion 150 of the motor vehicle-carrying deck 104 can thus be raised easily during loading of motor vehicles into the cargo well 59 to provide ample overhead clearance as motor vehicles pass over the truck 36 at each end of the multi-unit car 30 or over the shared truck 40 between car units 32 and 34.

End Doors

Figure 14:
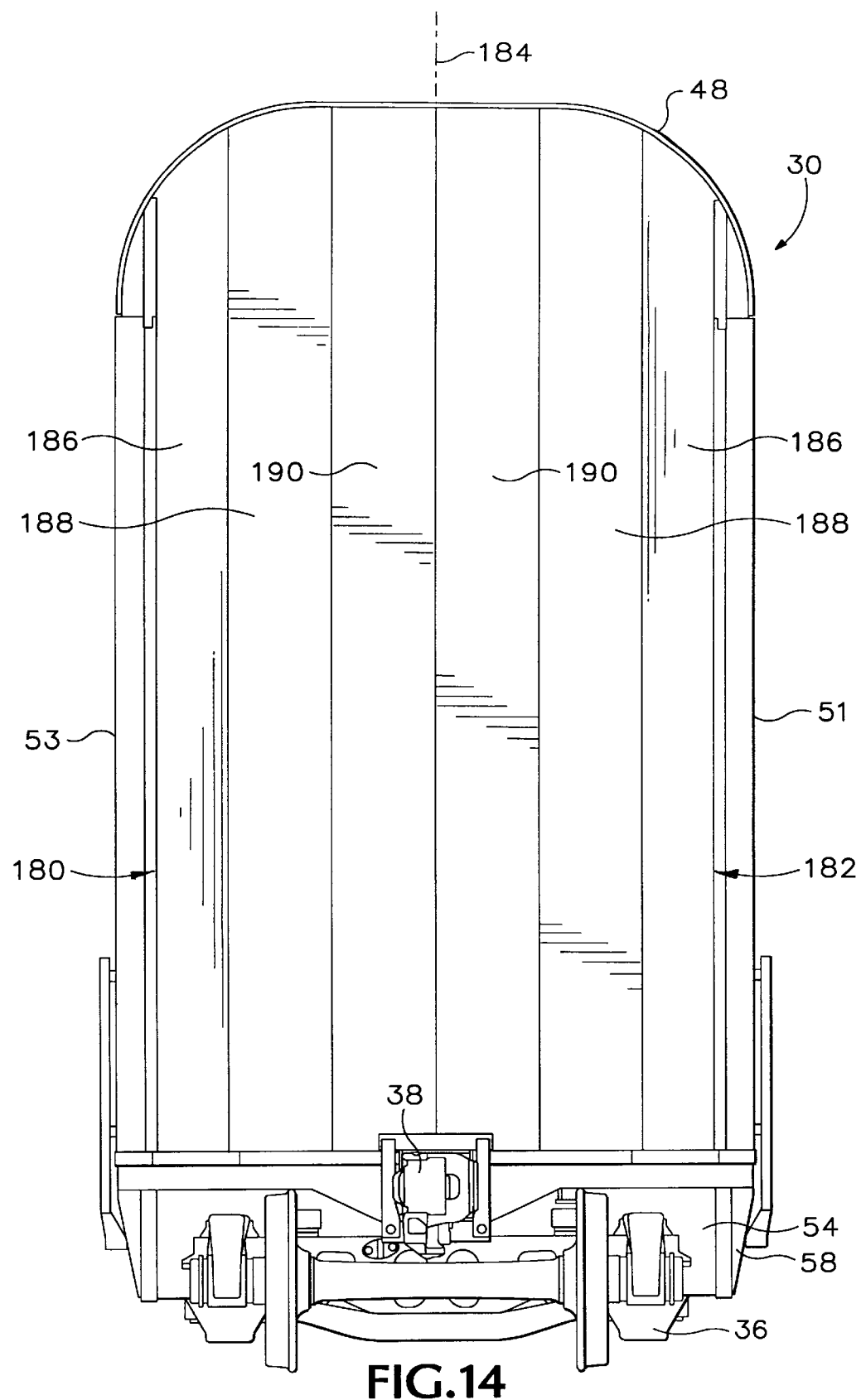
FIG. 14 is an end elevational view of the railroad freight car shown in FIG. 1, showing an arrangement of three-panel end doors which form one aspect of the present invention.

At each end of the multi-unit car 30, a pair of hinged three-panel doors 180 and 182 close the respective end of the multi-unit car 30. Each three-panel door 180 or 182 extends the entire height of the car body, as shown in FIG. 14, and extends from one side of the car body to the centerline 184 of the car body, as shown in FIGS. 14 and 15.

Figure 16:
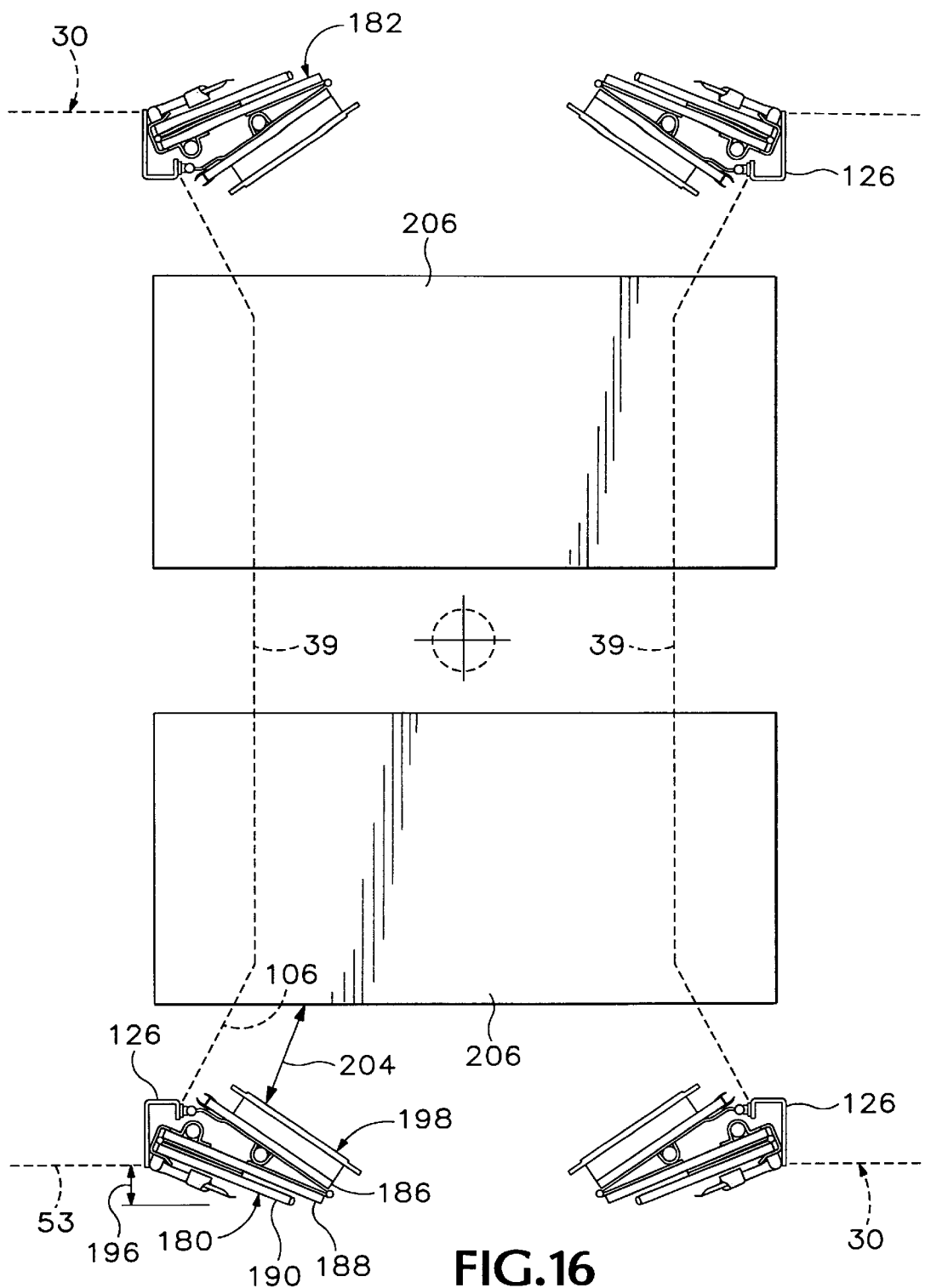
FIG. 16 is a top plan view of adjacent end portions of a pair of railroad freight cars of the type shown in FIG. 1, with the three-panel end doors in their open positions and bridge plates in place between the adjacent cars.

As shown in FIG. 16, each three-panel door 180 or 182 may be swung open into a position in which the three vertically-extending segments of each door, a corner panel 186, a middle panel 188, and a center panel 190, nest closely alongside each other and adjacent the respective corner post 126 of the car body 52, to which each of the three-panel doors is attached by a respective set of hinges 192.

The corner door panel 186 extends diagonally inward and slightly toward the end of the car from the corner post 126 when the three-panel door 180 is fully closed, and the middle and center panels 188, 190 extend substantially transversely, aligned with each other and with the center and middle panels 188, 190 of the door 182 on the opposite side of the centerline of the car 30. The middle and center panels 190 of the door 180 or 182 are attached to the corner panel 186 and middle panel 188, respectively, by hinges 194 which permit them to be folded parallel with each other and nearly parallel with the corner panel. The folded door 180 or 182 thus fits partially within the space defined by the J-shaped corner posts, as shown in FIG. 16, so that the folded door 180 or 182 extends outward, laterally of the car body 52, only a minimum distance 196, thus remaining within the available clearance envelope when the outer ends 39 of the car are fully opened to permit loading and unloading of motor vehicles. Thus, with the three-panel doors 180 and 182 fully opened, the doors are not exposed to damage from properly operated railroad trains on an adjacent track.

A ladder 198, including several horizontal rungs, or steps 200, supported by a pair of vertical side members 202, is attached to an inner side of the corner panel 186, and is available for use to climb to the upper motor vehicle-carrying deck 106, with ample clearance, as shown at 204, available between the ladder 198 and an adjacent bridge plate 206 extending between one of the motor vehicle-carrying decks 104 or 106 of the car 30 and an adjacent car 30 or a loading dock (not shown). When the doors 180, 182 are closed, however, the ladder 198 enclosed is inside the car and thus is unavailable, so that it cannot be used to gain unauthorized access to motor vehicles or other cargo carried in the car 30.

Roof

Referring to FIGS. 17, 18 and 19, the roof 48 extends upward above the top chords 124 and encloses the top of each car body 52. The roof 48 is of corrugated sheet metal construction which is, in a laterally central span 210, generally horizontal and self-supporting as a result of the corrugation of the sheet metal of which the roof 48 is constructed. A lower portion 212 of the roof 48, on each side of the car 30, extends steeply upward and curves arcuately inward toward the center line 184 of the car. Alternatively, the lower portions 212 of the roof 48 could be constructed of similarly corrugated sheet metal in the form of generally flat panels (not shown) joined at shallow angles.

A plurality of upwardly projecting reinforcing members, or partial carlines 214 are spaced apart longitudinally of the car 30 and are fastened to the inner, or lower, side of the lower portions 212 of the roof 48 at intervals corresponding with and aligned with the locations of the upstanding side posts 122 which are part of each side wall 46 of the car body 52. Each carline 214 is tapered from a widest or bottom end 216 portion adjacent the top chord 124 of the side wall 46 of the car body 52, to a narrow upper end 218. Each carline 214 is attached by fasteners 220 such as rivets, bolts, or the equivalent to the sheet metal of which the roof 48 itself is constructed, and the lower end 216 of each carnine 214 extends downwardly along the inner side of the vertical top portion 146 of the top chord member 124, to which the margin of the lower portion 212 of the upwardly extending arcuate roof panel is fastened by similar fasteners. Thus, the bottom ends 216 of the carlines 214 are spaced upwardly apart from the upper margin of the top chord member 124 by a small distance. An upright connecting member 222 is fastened to the lower end of the inner face of each carline by a similar fastener 220 and extends downward to and rests upon an upper face of the inwardly-directed horizontal bottom, or foot portion 140 of the top chord member 124, directly above the corresponding side post member 122. The upright connecting member 222 may have the form of a U-shaped channel, with a bottom portion of one leg of the channel cut away to provide access to weld the lower end of the upright connecting member 222 to the foot 140 of the top chord member 124 and to provide access for installation of one of the fasteners 220.

The outer skin of the roof 48, and the carlines 214, are made of pressed sheet metal, for example 14 gauge galvanized steel, with corrugations spaced 6 inches apart, center-to-center, for example, with each corrugation ⅞ inch deep, so that, including the thickness of the steel sheet, the depth 224 of the roof 48, from its uppermost outside surface to its lowermost inside surface at any point, is less than 1 inch. A clear horizontal span beneath the highest part of the roof 48 is nearly 4 feet wide, and a clear span between the topmost portions 218 of the carlines 214 is nearly 8 feet wide, in a preferred embodiment of the invention.

Figure 20:
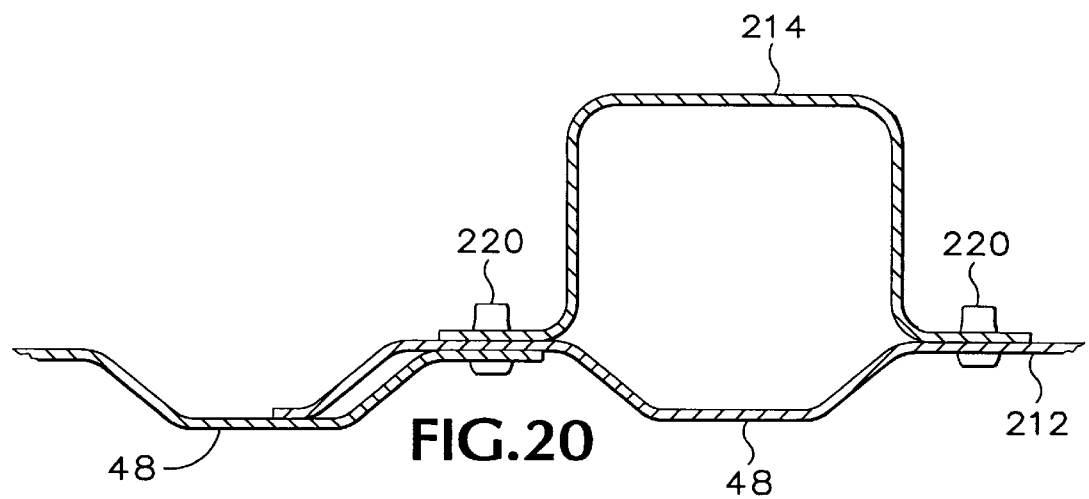
FIG. 20 is a section view on line 20—20 of FIG. 18 showing the attachment of a carnine as a portion of the structure of the roof of the railroad freight car shown in FIG. 1.

Preferably, the roof 48 may be made in sections each extending longitudinally of the car body the same distance as, or a multiple of the distance between adjacent upright side posts 122, so that the overlap of adjacent segments of the roof 48 coincides with and is fastened by the fasteners 220 attaching the carline 214 to the interior of the roof 48 as shown in FIG. 20. Fasteners 220 are spaced apart along each overlap joint between adjacent segments of the roof at appropriate distances, for example, approximately 9 inches, center-to-center, the spacing chosen to be close enough to cause adjacent longitudinal segments of the roof to support each other and remain rigidly interconnected.

Flexible Diaphragm

Between the adjacent ends 42 and 44 of the adjacent car units 32 and 34 of the multi-unit motor vehicle-carrying car 30 of the present invention, the flexible diaphragm 50 interconnects the sidewalls 46 and roof 48 of the adjacent car bodies 52, to provide protection against intrusion of dust-laden air or precipitation and to provide protection against unauthorized entry of persons or animals. The nominal distance between the side walls 46 and roofs 48 of adjacent ends 42 and 44 of the car units 32 and 34 may be 30 inches, for example, but may vary because of track curves in horizontal and vertical planes to be as small as about 7 inches or as much as about 52 inches. The diaphragm 50 must also accommodate lateral sway of the car units 32 and 34 in opposite directions.

Figure 21:
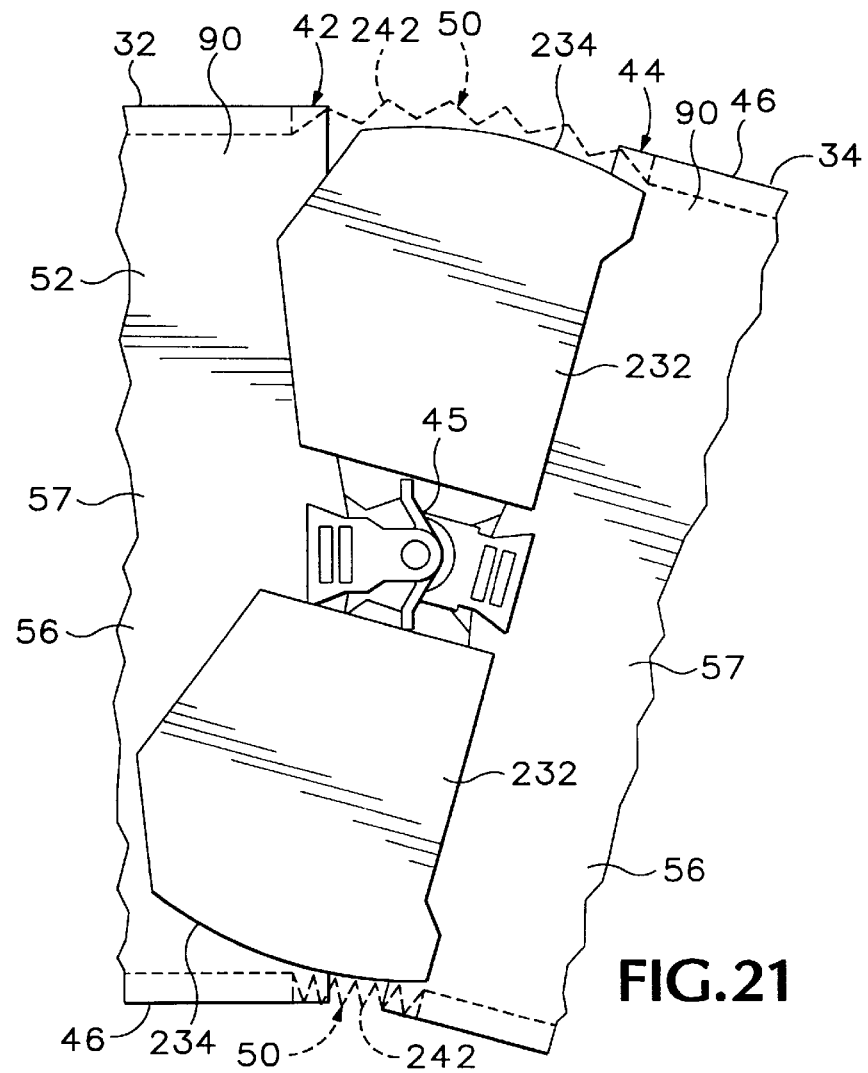
FIG. 21 is a top plan view of bridge plates between adjacent body bolsters and a flexible diaphragm interconnecting the bodies of the car units of the multi-unit freight car shown in FIG. 1 at an articulated coupling between the car units.

Bridging the space between the adjacent ends of the adjacent car units, on either side of the articulating coupling 45 interconnecting the car bodies 52, are a pair of bridge plates 232 shown in FIG. 21, one on either lateral side of the articulating coupling 45. Each bridge plate 232 is supported by the body bolsters 56 of both of the two car units 32, 34 and is attached to one of them so as to be movable with respect to the other in order to accommodate the relative movement of the car bodies 52 as the car 30 negotiates curves in the track on which it is operating. An outer margin 234 of each bridge plate 232 is arcuately curved.

The diaphragm 50 has the overall shape of an inverted U, and on each side 51, 53 of the car 30 has an upright portion 236 interconnecting the adjacent car body side walls 46 with vertical margins attached to the margins of the side walls 46. An arcuately curved upper portion 238 approximates the curvature of the roofs 208 of the adjacent car bodies 52. The diaphragm includes a flexible membrane 242 of a rubber-like material joined to the margins of the car body side walls 46 and roofs 48 by clamping brackets at the adjacent ends 42 and 44. The overall length of the flexible membrane 242 is greater than the greatest distance between adjacent side wall margins when the car 30 is on curved track, in order to accommodate relative movement between the car units 32 and 34, and the membrane is formed in a way which urges it to form curved pleats elastically, as with the bellows of an accordion, as the margins of the car body side walls 46 approach one another.

Preferably, the flexible membrane 242 in the upright portions 236 of the diaphragm 50 may be reinforced with suitable flexible fiber such as Kevlar™ aramid fiber cords or steel wires embedded in the rubber-like material, to be strong enough to resist entry. The membrane of the upper portion of the diaphragm 50, however, as it extends between the curved and horizontal portions of the roofs 48, may be subjected to an amount of elastic stretching, requiring that part of the membrane to be self-supporting and entirely of an elastic material.

Modular Brake System

Figure 24:
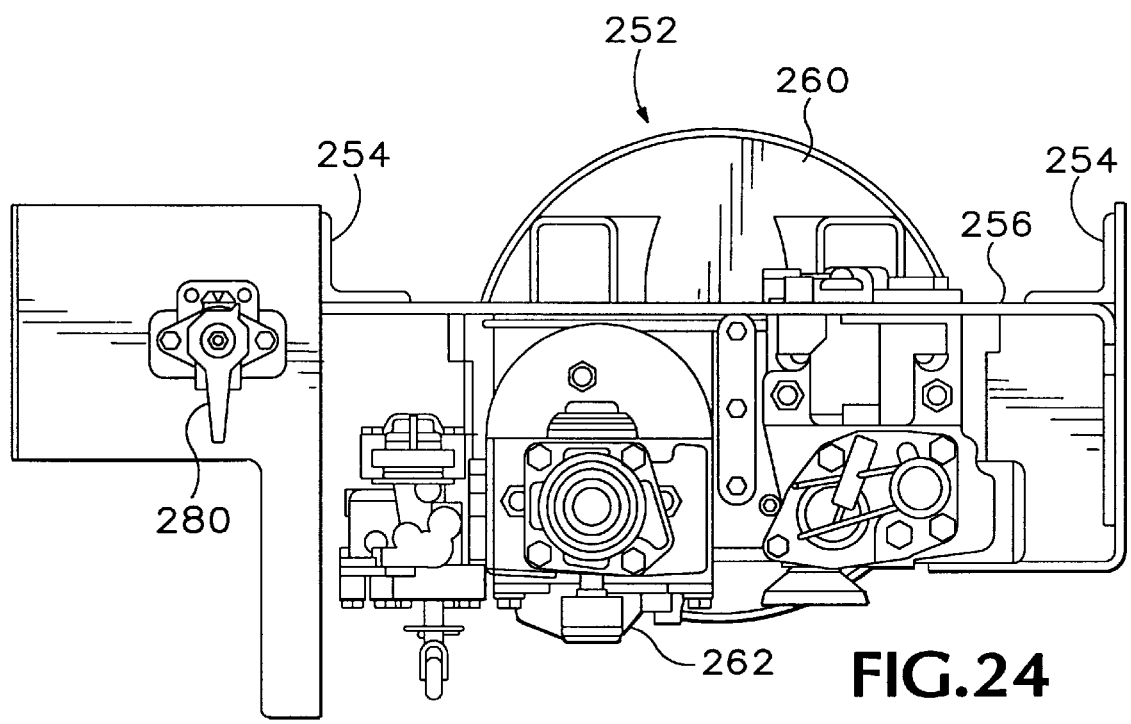
FIG. 24 is an end elevational view of the air brake system module shown in FIG. 22.

A brake system module 252 is supported beneath the car body 32, as shown in FIG. 1, and is shown in greater detail in FIGS. 22–24. As shown in FIG. 22, the brake system module 252 includes a modular support frame having a pair of frame sides 254 interconnected by shorter cross members 256 and 258. Near and partially supported by the cross member 258, a large generally cylindrical air reservoir 260 is mounted on the support frame. Adjacent to and supported partially by the cross member 256 at the other end of the frame is a conventional air brake control valve 262, which controls operation of the air brakes on the car 30. A trainline connector pipe 266 extends to a tee fitting 268 to connect the pipe 266 to the trainline 270 which extends longitudinally of the car. A brake cylinder connector line 272 also extends from the valve 262, with a branch 274 extending to a dummy reservoir 276 attached to one of the frame sides 254 by a suitable support frame 278 located near the air reservoir 260. A retaining valve 280 is also mounted on one of the frame side members 254, near the valve 262.

At each end of each of the support frame, holes are provided in frame side members 254 so that the module 252 can be attached to the car body 52 by bolting the frame side members 254 to respective mounting brackets 282 attached to the car body 52, and by connecting the train line 270 of the car 30 to the tee fitting 268 and the brake cylinder line 284 of the car 30 to the brake cylinder connector line 272.

The brake system module 252 thus includes the parts which are difficult to repair and the fittings which may be difficult to attach, all in the single module 252 which can be assembled and tested as a complete unit apart from the car 30 itself, thus simplifying assembly and installation of the brake system for the car 30.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a covered railroad freight car, a car body and roof structure comprising:

(a) a pair of upright side walls;

(b) a roof, including a laterally outwardly located panel having a lower margin resting atop and fastened to one of said side walls, a substantially horizontal central portion constructed of self-supporting corrugated sheet material, and a plurality of carlines spaced apart from one another longitudinally along said side walls and extending upward along respective portions of said laterally outwardly located panel and fastened to an interior side thereof, said central portion of said roof being free from said carlines.

2. The structure of claim 1 wherein said laterally outwardly located panel of said roof is substantially vertical and is interconnected with an upwardly adjacent inwardly-inclined panel connected with said inclined panel, said substantially vertical panel including said lower margin of said roof and said carlines extending upwardly along said upwardly-adjacent inwardly-inclined panel.

3. The structure of claim 1 wherein said carlines are of unitary pressed sheet metal structure.

4. The structure of claim 1 wherein said side walls include a plurality of upright side posts and each of said carlines is fastened atop a respective side post included in a respective one of said upright side walls.

* * * * *

UNITED STATES PATENT AND TRADEMARK OFFICE
CERTIFICATE OF CORRECTION

PATENT NO. : 5,979,335  
DATED : November 9, 1999  
INVENTOR(S) : Saxton et al.

Page 1 of 1

It is certified that error appears in the above-identified patent and that said Letters Patent is hereby corrected as shown below:

Column 2,  
Line 41, change "carnines" to -- carlines --  
Line 65, change "OF-THE" to -- OF THE --

Column 3,  
Line 10, change "unloading .of" to -- unloading of --  
Line 25, change "f" to -- of --  
Line 65, change "carnine" to -- carline --

Column 5,  
Line 13, change "body 52.," to -- body 52, --

Column 7,  
Line 53, change "has been." to -- has been --

Column 8,  
Line 4, change "of the of the" to -- of the --

Column 9,  
Line 52, change "carnine" to -- carline --

Signed and Sealed this

Twenty-first Day of May, 2002

*Attest:*

*Attesting Officer*

JAMES E. ROGAN  
*Director of the United States Patent and Trademark Office*